US011843318B2

(12) United States Patent
Yang et al.

(10) Patent No.: US 11,843,318 B2
(45) Date of Patent: Dec. 12, 2023

(54) CONVERTER AND POWER ADAPTER FOR REDUCING ENERGY LOSS

(71) Applicant: Huawei Digital Power Technologies Co., Ltd., Shenzhen (CN)

(72) Inventors: Gun Yang, Dongguan (CN); Liang Wu, Dongguan (CN); Zuwei He, Dongguan (CN)

(73) Assignee: HUAWEI DIGITAL POWER TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/668,238

(22) Filed: Feb. 9, 2022

(65) Prior Publication Data

US 2022/0255455 A1 Aug. 11, 2022

(30) Foreign Application Priority Data

Feb. 10, 2021 (CN) .......................... 202110185416.5

(51) Int. Cl.
*H02M 3/335* (2006.01)
*H02M 1/38* (2007.01)
*H02M 3/00* (2006.01)

(52) U.S. Cl.
CPC ......... *H02M 3/33571* (2021.05); *H02M 1/38* (2013.01); *H02M 3/01* (2021.05)

(58) Field of Classification Search
CPC ...................................................... H02M 1/38
See application file for complete search history.

(56) References Cited

U.S. PATENT DOCUMENTS

| 7,193,866 B1* | 3/2007 | Huang | H02M 1/08 363/22 |
| 10,389,223 B1* | 8/2019 | Bianco | H02M 1/083 |
| 2003/0197425 A1* | 10/2003 | Montante | H02M 1/10 307/26 |
| 2006/0215424 A1 | 9/2006 | Aso et al. | |
| 2006/0291117 A1* | 12/2006 | Kyono | H02M 3/33571 361/90 |
| 2014/0376275 A1* | 12/2014 | Ohashi | H02M 1/38 363/21.02 |
| 2016/0087543 A1* | 3/2016 | Jin | H02M 3/33571 363/21.03 |
| 2017/0155332 A1* | 6/2017 | Sigamani | H01F 38/00 |
| 2017/0264206 A1 | 9/2017 | Rana et al. | |
| 2018/0131285 A1 | 5/2018 | Stuler | |

(Continued)

FOREIGN PATENT DOCUMENTS

| CN | 101951152 A | 1/2011 |
| CN | 102355147 A | 2/2012 |

(Continued)

*Primary Examiner* — Gustavo A Rosario-Benitez
(74) *Attorney, Agent, or Firm* — WOMBLE BOND DICKINSON (US) LLP

(57) ABSTRACT

This application discloses a converter and a power adapter, to reduce an energy loss of the power adapter. The converter includes: a DC power supply, a primary power transistor, an auxiliary power transistor, a first capacitor, a transformer, and a control circuit. The first capacitor is connected in series to the transformer to form a series circuit, the series circuit is connected in parallel to a first terminal and a second terminal of the auxiliary power transistor. The control circuit is configured to: when an excitation current in the transformer is in a continuous state, regulate a target voltage to a preset voltage threshold, and control the primary power transistor to be turned on when first dead time ends, where the target voltage is a voltage between the first terminal of the primary power transistor and the ground.

14 Claims, 9 Drawing Sheets

(56) References Cited

U.S. PATENT DOCUMENTS

| | | | |
|---|---|---|---|
| 2018/0254710 A1* | 9/2018 | Wang | H02M 1/44 |
| 2019/0036442 A1 | 1/2019 | Oh | |
| 2019/0036446 A1* | 1/2019 | Yang | H02M 3/33569 |
| 2019/0190394 A1* | 6/2019 | Jitaru | H02M 1/083 |
| 2019/0222130 A1 | 7/2019 | Luo et al. | |
| 2019/0252995 A1 | 8/2019 | Dai | |
| 2020/0091826 A1* | 3/2020 | Yang | H02M 3/33523 |
| 2021/0143731 A1* | 5/2021 | Ji | H02M 1/38 |

FOREIGN PATENT DOCUMENTS

| | | |
|---|---|---|
| CN | 104578800 A | 4/2015 |
| CN | 204578376 U | 8/2015 |
| CN | 106505865 A | 3/2017 |
| CN | 206076929 U | 4/2017 |
| CN | 107733235 A | 2/2018 |
| CN | 108736729 A | 11/2018 |
| CN | 109194098 A | 1/2019 |
| CN | 109245569 A | 1/2019 |
| CN | 109995242 A | 7/2019 |
| CN | 110098743 A | 8/2019 |
| CN | 110794279 A | 2/2020 |
| CN | 111953185 A | 11/2020 |
| CN | 112117905 A | 12/2020 |
| EP | 3018814 A1 | 5/2016 |
| JP | 2000092829 A | 3/2000 |
| JP | 2006262566 A | 9/2006 |
| KR | 20170106204 A | 9/2017 |
| WO | 2020134672 A1 | 7/2020 |
| WO | 2020253826 A1 | 12/2020 |

\* cited by examiner

CONVERTER AND POWER ADAPTER FOR REDUCING ENERGY LOSS

CROSS-REFERENCE TO RELATED APPLICATIONS

This application claims priority to Chinese Patent Application No. 202110185416.5, filed on Feb. 10, 2021, which is hereby incorporated by reference in its entirety

TECHNICAL FIELD

This application relates to the field of power technologies, and in particular, to a converter and a power adapter.

BACKGROUND

With the development of consumer electronic products, various types of electronic products emerge. These electronic products usually need to match a power adapter to complete charging when being charged. With increasing requirements of consumers for the power adapter in terms of a volume, a charging speed, and the like, miniaturization and fast charging of the power adapter become an inevitable trend. Therefore, a power density of the power adapter needs to be improved. The power density is a size of an output power per unit volume.

If the power density is improved, a current or voltage increases. In this case, more energy is used to generate heat. However, a natural heat dissipation capacity of the power density per unit volume is limited. To meet a requirement of heat dissipation, how to reduce an energy loss of the power density becomes an urgent problem to be resolved.

SUMMARY

Embodiments of this application provide a converter and a power adapter, to reduce an energy loss of the power adapter.

In some embodiments (sometimes referred to as, "a first aspect"), a converter is provided. The converter includes: a DC power supply, a primary power transistor, an auxiliary power transistor, a first capacitor, a transformer, and/or a control circuit. The first capacitor is connected in series to the transformer to form a series circuit, the series circuit is connected in parallel to a first terminal and a second terminal of the auxiliary power transistor, a first terminal of the primary power transistor is connected to the second terminal of the auxiliary power transistor, a second terminal of the primary power transistor is connected to either a positive electrode or a negative electrode of the DC power supply, the first terminal of the auxiliary power transistor is connected to the other electrode of the DC power supply, and the negative electrode is grounded. In some embodiments, the control circuit is configured to: when an excitation current in the transformer is in a continuous state, regulate a target voltage to a preset voltage threshold, and control the primary power transistor to be turned on when first dead time ends, where the first dead time is a period of time after the auxiliary power transistor is turned off and before the primary power transistor is turned on, and the target voltage is a voltage between the first terminal of the primary power transistor and the ground.

In some embodiments, the converter is used in a power adapter, or may be used in an in-vehicle power supply or another product related to a DC/DC converter. In some embodiments, the DC power supply is configured to provide a DC voltage for another electronic component in the converter. Both the primary power transistor and the auxiliary power transistor are switching transistors. For example, the primary power transistor and the auxiliary power transistor may be metal-oxide-semiconductor (MOS) field effect transistors. In some embodiments, both the first terminal of the auxiliary power transistor and the first terminal of the primary power transistor may be source (S) electrodes or drain (D) electrodes. In some embodiments, if the first terminals are source electrodes, the second terminals are drain electrodes; or if the first terminals are drain electrodes, the second terminals are source electrodes. The DC power supply has a positive electrode and a negative electrode. In some embodiments, the positive electrode is similar to a positive electrode of a power supply, and the negative electrode is similar to a negative electrode of the power supply. In some embodiments, if one electrode is a positive electrode, the other electrode is a negative electrode; or if one electrode is a negative electrode, the other electrode is a positive electrode. In some embodiments, in the converter, the source electrode of the primary power transistor may be connected to the negative electrode, or the source electrode of the auxiliary power transistor may be connected to the negative electrode. In some embodiments, a function of the first capacitor is to resonate with an inductor in the transformer, a parasitic capacitor of the primary power transistor, and a parasitic capacitor of the auxiliary power transistor after the auxiliary power transistor is turned off.

In some embodiments, the primary power transistor and the auxiliary power transistor are not turned on at the same time, but may be turned off at the same time. In some embodiments, a period of time during which both the primary power transistor and the auxiliary power transistor are turned off or are not turned on is referred to as "dead time." In some embodiments, dead time after the auxiliary power transistor is turned off and before the primary power transistor is turned on is referred to as "first dead time" or "second dead time". In some embodiments, the voltage between the first terminal of the primary power transistor and the ground is referred to as a "target voltage", and the target voltage varies with time. An operation waveform of the target voltage refers to a waveform formed by a voltage that varies with operation time sequence of the converter, and the operation time sequence of the converter refers to a time sequence after the converter starts to operate. The target voltage varies continuously with operation time of the converter, to form a waveform.

In some embodiments, that the excitation current is continuous refers to that the excitation current is not interrupted within target dead time.

In some embodiments, the preset voltage threshold may be an empirical value obtained based on a plurality of experiment results, and the preset voltage threshold may be 0, may be a value close to 0, or may be another value. A value of the preset voltage threshold is related to a specific circuit structure of the converter. In some embodiments, the preset voltage threshold is a small value, and may be a value of a valley in the waveform of the target voltage, or may be a value close to the valley. In some embodiments, the preset voltage threshold may be alternatively a DC voltage output by the DC power supply or a value close to the DC voltage.

In some embodiments, regardless of whether the preset voltage threshold is 0 or a DC voltage output by the DC power supply, an objective of this application is to make voltages at the two terminals of the primary power transistor 0 or close to 0, and turn on the primary power transistor when the voltages close to 0 or are 0.

In some embodiments, because a turn-on voltage of the primary power transistor is directly proportional to an energy loss of the primary power transistor, when the target voltage is at the preset voltage threshold, the primary power transistor is turned on, so that the primary power transistor operates. Because the preset voltage threshold is equal to 0 or the preset voltage threshold is extremely small, the primary power transistor is turned on at a voltage of 0 or an extremely small voltage, and the energy loss is the lowest. It can be learned that the converter provided in the first aspect can reduce the energy loss of the primary power transistor, thereby reducing an energy loss of the converter and an energy loss of the power adapter.

In some embodiments, the control circuit is further configured to: in a switching cycle, if the excitation current in the transformer is continuous, detect the target voltage when second dead time ends, and regulate turn-on duration of the auxiliary power transistor based on the target voltage, where in the switching cycle, the primary power transistor and the auxiliary power transistor each are turned on at least once, and the second dead time is a period of time that is before the first dead time and that is after the auxiliary power transistor is turned off and before the primary power transistor is turned on.

In some embodiments, the second dead time can be any period of time that is before the first dead time and that is after the auxiliary power transistor is turned off and before the primary power transistor is turned on. In some embodiments, "when second dead time ends" refers to a moment at which the second dead time is about to end, for example, a last microsecond or a last nanosecond of the second dead time. A specific time point is not limited in this application, provided that a latest target voltage can be detected when the second dead time ends. In some embodiments, that the excitation current is continuous refers to that the excitation current is not interrupted within a switching cycle. There may be a plurality of manners of detecting the target voltage. For example, the control circuit is directly connected to the first terminal of the primary power transistor and is grounded, to measure the target voltage. The target voltage may alternatively be detected in an indirect manner, for example, the target voltage may be detected by using the transformer. In some embodiments, the target voltage can reach the preset voltage threshold as soon as possible by regulating turn-on duration of the auxiliary switching transistor, thereby improving regulation efficiency of the target voltage.

In some embodiments, the control circuit is further configured to: determine a comparison result between the target voltage and the preset voltage threshold, and regulate the turn-on duration of the auxiliary power transistor based on the comparison result.

In some embodiments, in the converter, when the source electrode of the primary power transistor is connected to the negative electrode, and the source electrode of the auxiliary power transistor is connected to the negative electrode, the preset voltage threshold is different. The comparison result between the target voltage and the preset voltage threshold may be that the target voltage is greater than the preset voltage threshold, or may be that the target voltage is less than the preset voltage threshold. Regulation of the turn-on duration of the auxiliary power transistor may be an increase in the turn-on duration of the auxiliary power transistor, or a decrease in the turn-on duration of the auxiliary power transistor. In some embodiments, a magnitude of an excitation current in a negative direction in the transformer can be changed by regulating the turn-on duration of the auxiliary power transistor. The excitation current affects the target voltage of the primary power transistor. In this way, the primary power transistor can be turned on at a lower voltage, thereby further reducing the energy loss of the primary power transistor.

In some embodiments, the second terminal of the primary power transistor is connected to the negative electrode, and the first terminal of the auxiliary power transistor is connected to the positive electrode. The control circuit is specifically configured to: when the comparison result indicates that the target voltage is greater than the preset voltage threshold, prolong next turn-on duration of the auxiliary power transistor on a basis of last turn-on duration of the auxiliary power transistor, or when the comparison result indicates that the target voltage is less than the preset voltage threshold, shorten next turn-on duration of the auxiliary power transistor on a basis of last turn-on duration of the auxiliary power transistor.

In some embodiments, the second terminal of the primary power transistor is a source electrode, the first terminal of the auxiliary power transistor is a drain electrode, the drain electrode of the primary power transistor is connected to the source electrode of the auxiliary power transistor, the source electrode of the primary power transistor is connected to the negative electrode, and the drain electrode of the auxiliary power transistor is connected to the positive electrode. In this connection structure, the preset voltage threshold is usually 0. If the preset voltage threshold is represented by $V_{th}$, and the target voltage is represented by $V_{dssw}$, the comparison result may be $V_{dssw}>V_{th}$ or $V_{dssw}<V_{th}$. If $V_{dssw}>V_{th}$, it indicates that the target voltage needs to be further reduced, and the turn-on duration of the auxiliary power transistor needs to be increased, so that the excitation current in the negative direction of the transformer further increases. In this way, the target voltage correspondingly decreases. Otherwise, if $V_{dssw}<V_{th}$, it indicates that the target voltage needs to be increased, that is, the excitation current in the negative direction of the transformer needs to be reduced. This objective may be achieved by shortening the turn-on duration of the auxiliary power transistor. Regardless of the comparison result, the target voltage may be as close to the preset voltage threshold as possible through corresponding regulation, so that the target voltage reaches the preset voltage threshold as soon as possible. In this way, the primary power transistor can be turned on at a lower voltage, and the energy loss of the primary power transistor can be further reduced.

In some embodiments, the second terminal of the primary power transistor is connected to the positive electrode, and the first terminal of the auxiliary power transistor is connected to the negative electrode. The control circuit is specifically configured to: when the comparison result indicates that the target voltage is greater than the preset voltage threshold, shorten next turn-on duration of the auxiliary power transistor on a basis of last turn-on duration of the auxiliary power transistor, or when the comparison result indicates that the target voltage is less than the preset voltage threshold, prolong next turn-on duration of the auxiliary power transistor on a basis of last turn-on duration of the auxiliary power transistor.

In some embodiments, the second terminal of the primary power transistor is a drain electrode, the first terminal of the auxiliary power transistor is a source electrode, the source electrode of the primary power transistor is connected to the drain electrode of the auxiliary power transistor, the source electrode of the auxiliary power transistor is connected to the negative electrode, and the drain electrode of the primary power transistor is connected to the positive electrode. In this connection structure, the preset voltage threshold is usually a voltage difference $V_{in}$ between both terminals of the DC power supply. If the preset voltage threshold is represented by $V_{th}$, and the target voltage is represented by $V_{dssw}$, the comparison result may be $V_{dssw}>V_{th}$ or $V_{dssw}<V_{th}$. If $V_{dssw}<V_{th}$, it indicates that the target voltage needs to be increased, and the excitation current in the negative direction needs to be increased. In this way, the target voltage correspondingly increases, and the excitation current can be increased by increasing the turn-on duration of the auxiliary power transistor. Therefore, when $V_{dssw}<V_{th}$, the turn-on duration of the auxiliary power transistor needs to be increased. Otherwise, if $V_{dssw}>V_{th}$, it indicates that the target voltage needs to be reduced, and the excitation current in the negative direction needs to be reduced. In this way, the target voltage correspondingly decreases, and a magnitude of the excitation current can be reduced by shortening the turn-on duration of the auxiliary power transistor. Therefore, when $V_{dssw}>V_{th}$, the turn-on duration of the auxiliary power transistor needs to be shortened. Regardless of the comparison result, the target voltage may be as close to the preset voltage threshold as possible through corresponding regulation. In this way, the primary power transistor can be turned on at a lower voltage, and the energy loss of the primary power transistor can be further reduced.

In some embodiments, the control circuit includes a detection circuit, a power transistor control circuit, a first drive circuit, and a second drive circuit. The power transistor control circuit is separately connected to the detection circuit, the first drive circuit, and the second drive circuit, the first drive circuit is connected to the primary power transistor, and the second drive circuit is connected to the auxiliary power transistor. The detection circuit is configured to detect the target voltage. The power transistor control circuit is configured to send a drive signal for the first drive circuit or the second drive circuit based on a detection result of the detection circuit. The first drive circuit is configured to drive, based on the drive signal, the primary power transistor to be turned on or turned off. The second drive circuit is configured to drive, based on the drive signal, the auxiliary power transistor to be turned on or turned off.

In some embodiments, the control circuit can include a plurality of circuits, where the detection circuit is configured to detect the target voltage between the first terminal and the second terminal of the primary power transistor, the power transistor control circuit can generate the drive signal based on the detection result of the detection circuit, the first drive circuit can drive the primary power transistor based on the drive signal, and the second drive circuit can drive the auxiliary power transistor based on the drive signal.

In some embodiments, the converter further includes a second capacitor, and two terminals of the second capacitor are respectively connected to the positive electrode and the negative electrode of the DC power supply.

In some embodiments, the transformer includes a primary-side winding and a secondary-side winding, a dotted terminal of the primary-side winding is connected to the first capacitor, and a dotted terminal of the secondary-side winding is grounded.

The circuit structure described in this embodiment may be applied to an asymmetric half-bridge flyback topology.

In some embodiments, the transformer includes a primary-side winding and a secondary-side winding, a dotted terminal of the primary-side winding is connected to the first capacitor, and a dotted terminal of the secondary-side winding is connected to a synchronous rectifier of the secondary side.

The circuit structure described in this possible implementation may be applied to an asymmetric half-bridge forward topology.

In some embodiments (sometimes referred to as, "a second aspect"), a power adapter is provided. The power adapter includes the converter described in the first aspect or any possible implementation of the first aspect, an alternating current/direct current (AC/DC) converter, and a filter circuit. The filter circuit is separately connected to the AC/DC converter and the converter. The AC/DC converter is configured to convert an alternating current in a power grid into a direct current. The converter is configured to provide a DC voltage for a load. The filter circuit is configured to filter noise in the AC/DC converter and the converter.

In some embodiments, the power adapter may be a power adapter of various terminal devices, for example, a mobile phone, a notebook computer, a tablet computer, an electronic wearable device, an in-vehicle device, and an electronic home device. A structure and an appearance of the power adapter may be different, but the converter described in the first aspect or any possible implementation of the first aspect of this application is used, or the converter described in the second aspect or any possible implementation of the second aspect of this application is used.

In some embodiments, the converter provided in the first aspect or any possible implementation of the first aspect may be further used in another product in addition to the power adapter, for example, an in-vehicle power supply, a base station power supply, or another product related to a DC/DC converter.

DESCRIPTION OF EMBODIMENTS

The following describes embodiments of this application with reference to accompanying drawings. It is clear that the described embodiments are merely some rather than all of the embodiments of this application. A person of ordinary skill in the art may learn that the technical solutions provided in the embodiments of this application are also applicable to a similar technical problem as a technology evolves and a new scenario emerges.

In the specification, claims, and accompanying drawings of this application, the terms "first", "second", and the like are intended to distinguish between similar objects but do not necessarily indicate a specific order or sequence. It should be understood that data termed in such a way is interchangeable in proper circumstances, so that the embodiments described herein can be implemented in other orders than the order illustrated or described herein. Moreover, the terms "include", "contain" and any other variants mean to cover non-exclusive inclusion. For example, a process, method, system, product, or device that includes a list of operations or units is not necessarily limited to those expressly listed operations or units, but may include other operations or units that are not expressly listed or inherent to the process, method, product, or device.

Embodiments of this application provide a converter and a power adapter, to reduce an energy loss of the power adapter. The following separately provides detailed description.

With the development of technologies, various types of electronic products emerge and penetrate into all aspects of people's lives. These electronic products either need to be connected to a mains supply or pre-charged when being used. Because voltages of many electronic products do not match the mains supply, these terminal devices need to be connected to the mains supply by using a power adapter for charging.

Figure 1:
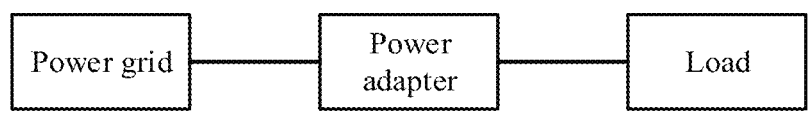
FIG. 1 is a schematic diagram of an application scenario of a power adapter.

As shown in FIG. 1, one terminal of a power adapter is connected to a power grid, and the other terminal of the power adapter is connected to a load. The power grid is usually a power supply network of the mains supply used by residents, and the load may be a terminal device of any type. For example, the load may be a mobile phone, a tablet computer, a notebook computer, an electronic wearable device, a pair of electronic glasses, an electric toothbrush, a cleaner, or an electric bicycle.

Figure 2:
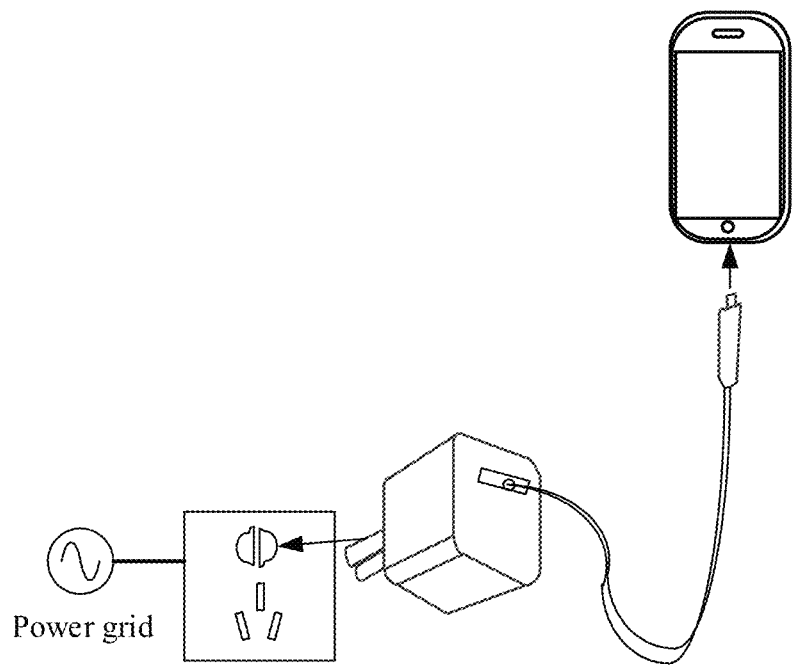
FIG. 2 is a schematic diagram of another application scenario of a power adapter.

For a scenario in which a power adapter charges a load, refer to a mobile phone charging scenario shown in FIG. 2. As shown in FIG. 2, one terminal of a power adapter is connected to a power grid through a socket, and the other terminal of the power adapter is connected to a mobile phone, so that a charging loop from the power grid to the mobile phone can be connected, thereby implementing a charging process of the mobile phone.

The power adapter shown in FIG. 2 is merely a possible form. In some embodiments, there may be a plurality of types of power adapters. Power adapters of terminal devices of different types may be different, and power adapters of terminal devices of a same type may be different. This is not limited in this application.

Figure 3:
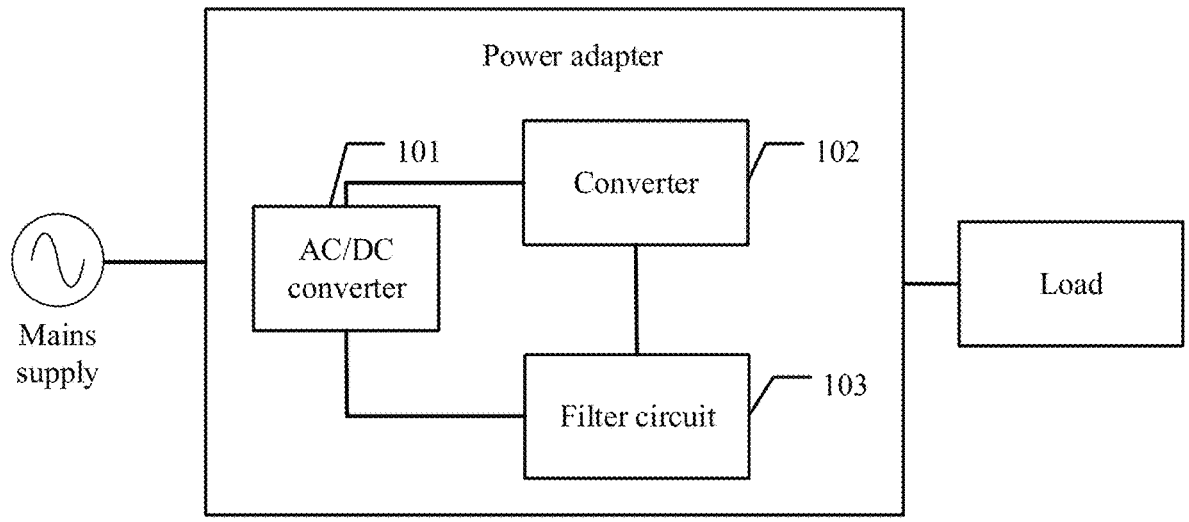
FIG. 3 is a schematic diagram of a structure of a power adapter according to an embodiment of this application.

The following describes an internal structure of the power adapter. FIG. 3 is a schematic diagram of a possible structure of a power adapter. As shown in FIG. 3, the power adapter includes an AC/DC converter 101, a converter 102, and a filter circuit 103. The filter circuit 103 is separately connected to the converter 102 and the AC/DC converter 101, where the AC/DC converter 101 is configured to convert an alternating current in a power grid into a direct current, and the converter 102 is configured to provide a DC voltage for a load; and the filter circuit 103 is configured to filter noise in the AC/DC converter 101 and the converter 102.

The AC/DC converter and the filter circuit are not excessively described in this application. The following describes the converter provided in the embodiments of this application with reference to FIG. 4.

Figure 4:
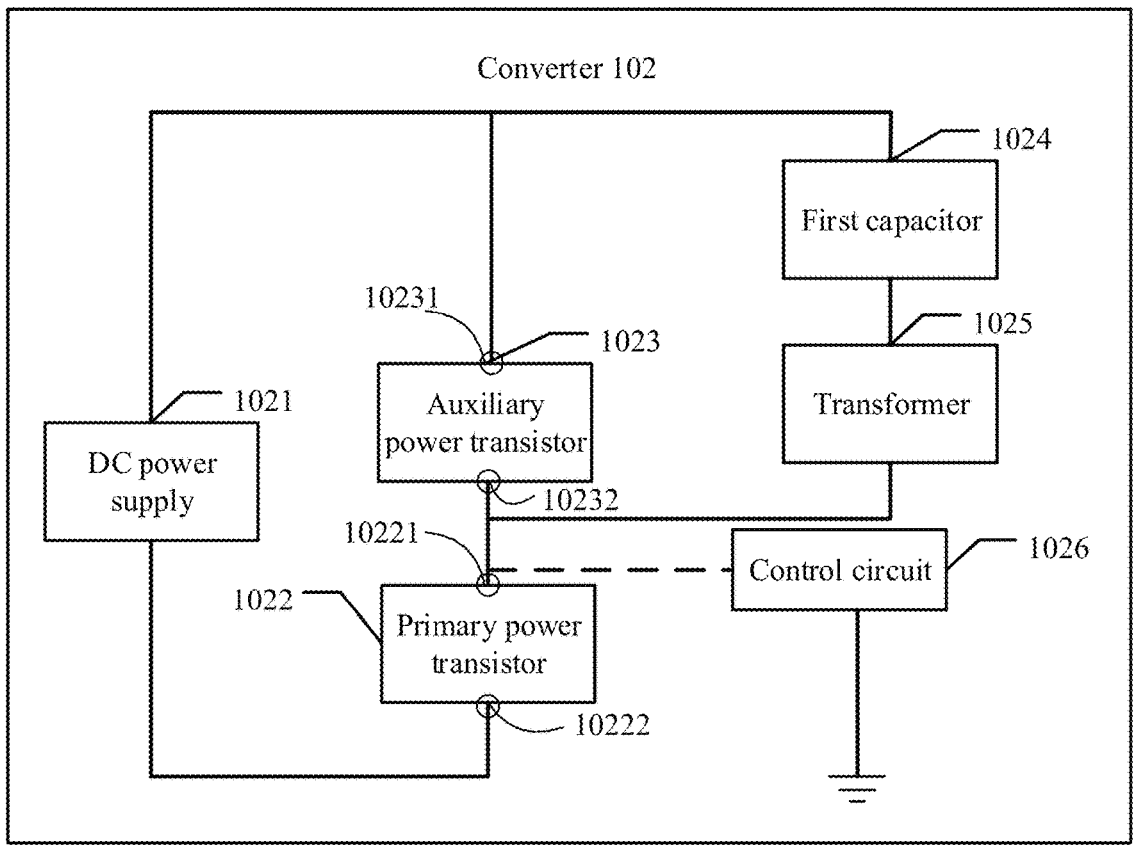
FIG. 4 is a schematic diagram of a structure of a converter according to an embodiment of this application.

FIG. 4 is a schematic diagram of a structure of a converter according to an embodiment of this application. As shown in FIG. 4, the converter includes a DC power supply 1021, a primary power transistor 1022, an auxiliary power transistor 1023, a first capacitor 1024, a transformer 1025, and a control circuit 1026. The first capacitor 1024 is connected in series to the transformer 1025 to form a series circuit, the series circuit is connected in parallel to a first terminal 10231 and a second terminal 10232 of the auxiliary power transistor 1023, a first terminal 10221 of the primary power transistor 1022 is connected to the second terminal 10232 of the auxiliary power transistor 1023, a second terminal 10222 of the primary power transistor is connected to either a positive electrode or a negative electrode of the DC power supply 1021, the first terminal 10231 of the auxiliary power transistor 1023 is connected to the other electrode of the DC power supply 1021, and the negative electrode of the DC power supply 1021 is grounded.

The control circuit 1026 is configured to: when an excitation current in the transformer is in a continuous state, regulate a target voltage to a preset voltage threshold, and control the primary power transistor to be turned on when first dead time ends, where the first dead time is a period of time after the auxiliary power transistor is turned off and before the primary power transistor is turned on, and the target voltage is a voltage between the first terminal of the primary power transistor and the ground.

The DC power supply is configured to provide a DC voltage for another electronic component in the converter. Both the primary power transistor and the auxiliary power transistor are switching transistors. For example, the primary power transistor and the auxiliary power transistor may be metal-oxide-semiconductor (MOS) field effect transistors. When the primary power transistor is turned on, the first capacitor may avoid a short circuit of a path formed by the DC power supply, the primary power transistor, the first capacitor, and the transformer. Both the first terminal of the auxiliary power transistor and the first terminal of the primary power transistor may be source (S) electrodes or drain (D) electrodes. If the first terminals are source electrodes, the second terminals are drain electrodes; or if the first terminals are drain electrodes, the second terminals are source electrodes. The DC power supply has a positive electrode and a negative electrode. The positive electrode is similar to a positive electrode of a power supply, and the negative electrode is similar to a negative electrode of the power supply. If one electrode is a positive electrode, the other electrode is a negative electrode; or if one electrode is a negative electrode, the other electrode is a positive electrode. In the converter, the source electrode of the primary power transistor may be connected to the negative electrode, or the source electrode of the auxiliary power transistor may be connected to the negative electrode. A function of the first capacitor is to resonate with an inductor in the transformer, a parasitic capacitor of the primary power transistor, and a parasitic capacitor of the auxiliary power transistor after the auxiliary power transistor is turned off.

In this application, in an operation process of the converter, the primary power transistor and the auxiliary power transistor are not turned on at the same time, but may be turned off at the same time. A period of time during which both the primary power transistor and the auxiliary power transistor are turned off or are not turned on is referred to as a "dead time", and in this application, dead time after the auxiliary power transistor is turned off and before the primary power transistor is turned on is referred to as "first dead time" or "second dead time". In this application, the voltage between the first terminal of the primary power transistor and the ground is referred to as a "target voltage", and the target voltage varies with time. An operation waveform of the target voltage refers to a waveform formed by a voltage that varies with operation time sequence of the converter, and the operation time sequence of the converter refers to a time sequence after the converter starts to operate. The target voltage varies continuously with operation time of the converter, to form a waveform.

In this application, that the excitation current is continuous refers to that the excitation current is not interrupted within target dead time.

In some embodiments, the preset voltage threshold may be an empirical value obtained based on a plurality of experiment results, and the preset voltage threshold may be 0, may be a value close to 0, or may be another value. A value of the preset voltage threshold is related to a specific circuit structure of the converter. In some embodiments, the preset voltage threshold is a small value, and may be a value of a valley in the waveform of the target voltage, or may be a value close to the valley. In some embodiments, the preset voltage threshold may be alternatively a DC voltage output by the DC power supply or a value close to the DC voltage.

Figure 5:
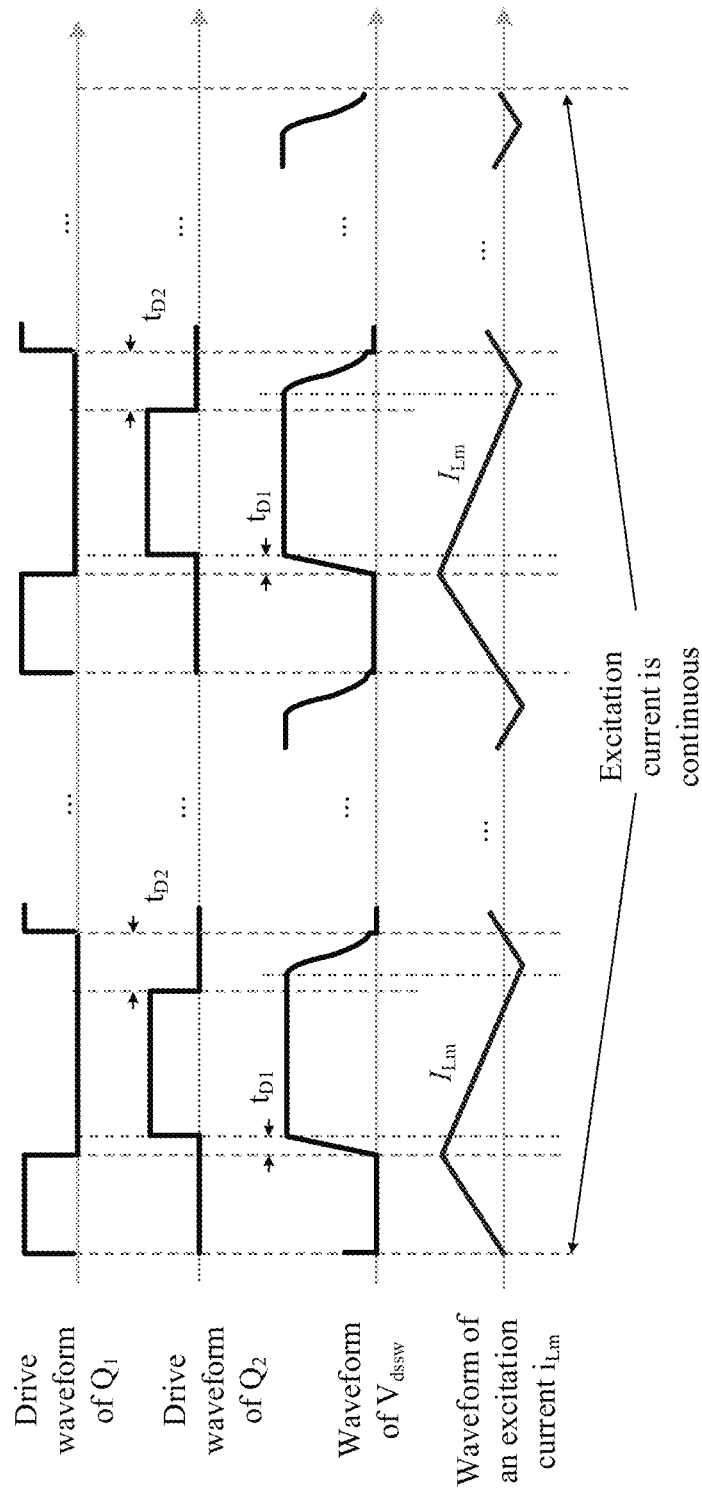
FIG. 5 is a time sequence diagram when a converter operates according to an embodiment of this application.

For the operation time sequence of the converter and the operation waveform of the target voltage, refer to a time sequence diagram shown in FIG. 5 for understanding. As shown in FIG. 5, in the operation time sequence, the primary power transistor and the auxiliary power transistor are in a turn-on state or a turn-off state in different time periods. Turn-on or turn-off of the primary power transistor and the auxiliary power transistor affects the target voltage and the excitation current of the transformer, and the waveform of the target voltage and a waveform of the excitation current correspondingly change. In FIG. 5, in this application, a period of time during which the primary power transistor is turned on once and the auxiliary power transistor is turned on once is one cycle, and there may be a plurality of cycles in a continuous waveform. In this application, $t_{D1}$ and $t_{D2}$ in the diagram each is used to mark dead time. The dead time refers to a period of time during which the primary power transistor and the auxiliary power transistor are not turned on. A difference lies in that $t_{D1}$ indicates dead time after the primary power transistor is turned off and before the auxiliary power transistor is turned on, and $t_{D2}$ indicates dead time after the auxiliary power transistor is turned off and before the primary power transistor is turned on. Both the first dead time and the second dead time in this application are dead time indicated by $t_{D2}$.

In this application, regardless of whether the preset voltage threshold is 0 or a DC voltage output by the DC power supply, an objective of this application is to make voltages at the two terminals of the primary power transistor 0 or close to 0, and turn on the primary power transistor when the voltages close to 0 or are 0.

In this application, because a turn-on voltage of the primary power transistor is directly proportional to an energy loss of the primary power transistor, when the target voltage is at the preset voltage threshold, the primary power transistor is turned on, so that the primary power transistor operates. Because the preset voltage threshold is equal to 0 or the preset voltage threshold is extremely small, the primary power transistor is turned on at a voltage of 0 or an extremely small voltage, and the energy loss is the lowest. It can be learned that the converter provided in the first aspect can reduce the energy loss of the primary power transistor, thereby reducing an energy loss of the converter and an energy loss of the power adapter.

The control circuit in FIG. 4 is further configured to: in a switching cycle, if the excitation current in the transformer is continuous, detect the target voltage when second dead time ends, and regulate turn-on duration of the auxiliary power transistor based on the target voltage, where in the switching cycle, the primary power transistor and the auxiliary power transistor each are turned on at least once, and the second dead time is a period of time that is before the first dead time and that is after the auxiliary power transistor is turned off and before the primary power transistor is turned on.

In this application, the second dead time can be any period of time that is before the first dead time and that is after the auxiliary power transistor is turned off and before the primary power transistor is turned on. In this application, "when second dead time ends" refers to a moment at which the second dead time is about to end, for example, a last microsecond or a last nanosecond of the second dead time. A specific time point is not limited in this application, provided that a latest target voltage can be detected when the second dead time ends. That the excitation current is continuous refers to that the excitation current is not interrupted within a switching cycle. There may be a plurality of manners of detecting the target voltage. For example, the control circuit is directly connected to the first terminal of the primary power transistor and is grounded, to measure the target voltage. The target voltage may alternatively be detected in an indirect manner, for example, the target voltage may be detected by using the transformer. In some embodiments, the target voltage can reach the preset voltage threshold as soon as possible by regulating turn-on duration of the auxiliary switching transistor, thereby improving regulation efficiency of the target voltage.

In the foregoing described content, the control circuit can control turn-on or turn-off of the primary power transistor. In this application, the control circuit can further control turn-on or turn-off of the auxiliary power transistor. The control circuit may determine a comparison result between the target voltage and the preset voltage threshold, and regulate the turn-on duration of the auxiliary power transistor based on the comparison result. In the converter, when the source electrode of the primary power transistor is connected to the negative electrode, and the source electrode of the auxiliary power transistor is connected to the negative electrode, the preset voltage threshold is different. The comparison result between the target voltage and the preset voltage threshold may be that the target voltage is greater than the preset voltage threshold, or may be that the target voltage is less than the preset voltage threshold. Regulation of the turn-on duration of the auxiliary power transistor may be an increase in the turn-on duration of the auxiliary power transistor, or a decrease in the turn-on duration of the auxiliary power transistor. In some embodiments, a magnitude of an excitation current in a negative direction in the transformer can be changed by regulating the turn-on duration of the auxiliary power transistor. The excitation current affects the target voltage of the primary power transistor. In this way, the primary power transistor can be turned on at a lower voltage, thereby further reducing the energy loss of the primary power transistor.

Because there may be two connection relationships between both of the primary power transistor and the auxiliary power transistor and the DC power supply, when the control circuit regulates the turn-on duration of the auxiliary power transistor, connection relationships are different for different regulation manners. The following describes the two different connection relationships and execution processes of the control circuit under different connection relationships with reference to circuit diagrams.

1. The first terminals of the primary power transistor and the auxiliary power transistor are drain electrodes, and the second terminals thereof are source electrodes. The drain electrode of the primary power transistor is connected to the source electrode of the auxiliary power transistor, the source electrode of the primary power transistor is connected to the negative electrode, and the drain electrode of the auxiliary power transistor is connected to the positive electrode.

Figure 6:
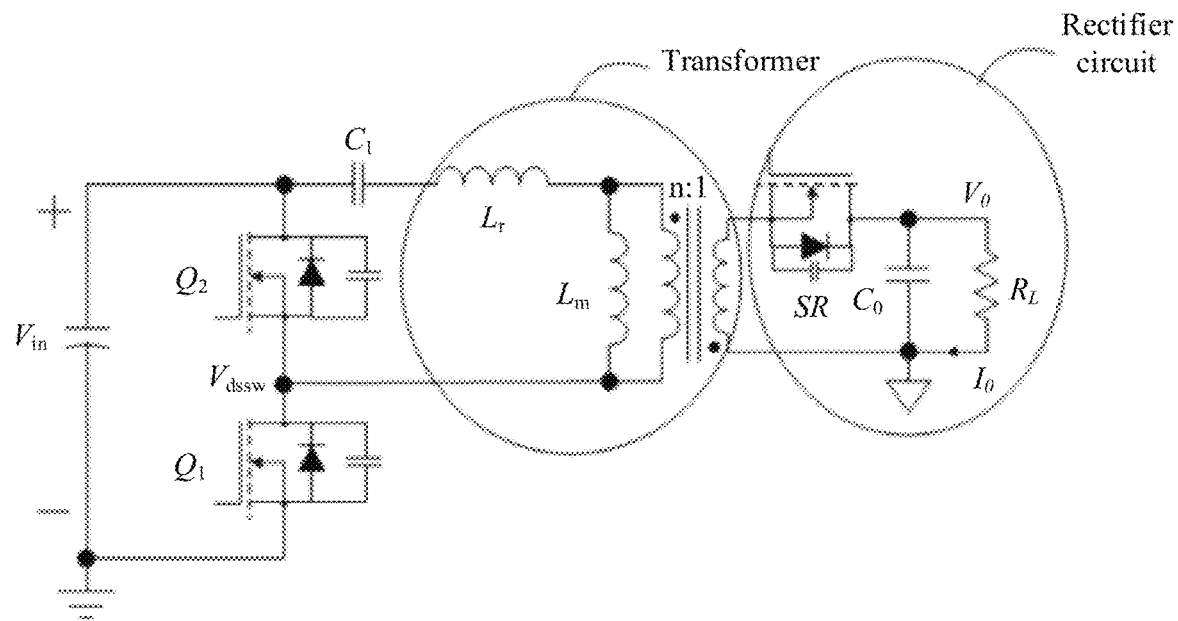
FIG. 6 is a circuit diagram of a converter according to an embodiment of this application.

For a circuit diagram of this connection relationship, refer to FIG. 6 for understanding. As shown in FIG. 6, $Q_1$ is the primary power transistor, $Q_2$ is the auxiliary power transistor, $C_1$ is the first capacitor, and $V_{in}$ is a voltage output by the DC power supply. "+" is the positive electrode, "−" is the negative electrode, and $V_{dssw}$ is the target voltage. Although not shown in FIG. 6, actually, the control circuit may be connected to the source electrode and a gate electrode of the primary power transistor, so as to control turn-on or turn-off of the primary power transistor. FIG. 6 further shows the transformer and a rectifier circuit. The rectifier circuit is connected to a secondary side of the transformer, and the rectifier circuit is configured to rectify a current output by the transformer.

In FIG. 6, a series circuit formed by the transformer and the first capacitor $C_1$ is connected in parallel to the source electrode and the drain electrode of the auxiliary power transistor $Q_2$. The drain electrode of the auxiliary power transistor $Q_2$ is connected to the positive electrode, the source electrode of the primary power transistor $Q_1$ is connected to the negative electrode, and the drain electrode of the primary power transistor $Q_1$ is connected to the source electrode of the auxiliary power transistor $Q_2$. The transformer includes a primary-side winding and a secondary-side winding, a dotted terminal of the primary-side winding is connected to the first capacitor $C_1$, and a dotted terminal of the secondary-side winding is grounded.

In the connection relationship formula shown in FIG. 6, the control circuit determines the comparison result between the target voltage and the preset voltage threshold. When the comparison result indicates that the target voltage is greater than the preset voltage threshold, next turn-on duration of the auxiliary power transistor is prolonged on a basis of last turn-on duration of the auxiliary power transistor, or when the comparison result indicates that the target voltage is less than the preset voltage threshold, next turn-on duration of the auxiliary power transistor is shortened on a basis of last turn-on duration of the auxiliary power transistor.

Figure 7:
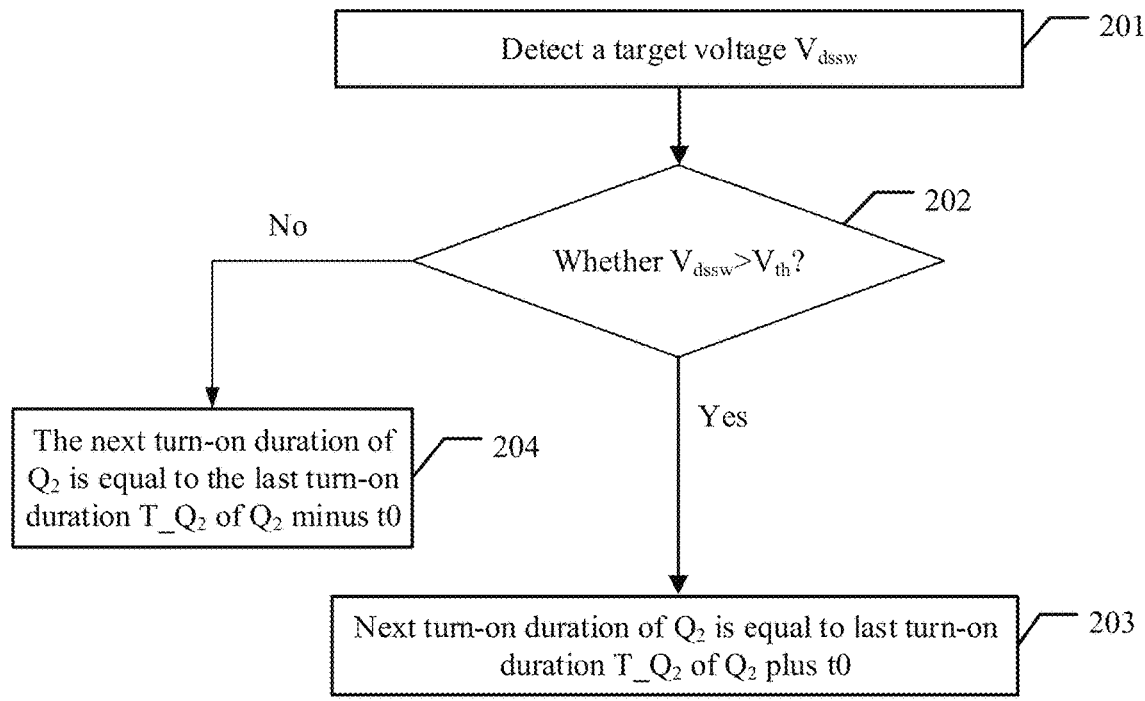
FIG. 7 is a schematic diagram of a regulation process of turn-on duration of an auxiliary power transistor according to an embodiment of this application.

If the preset voltage threshold is represented by $V_{th}$, the comparison result may be $V_{dssw}>V_{th}$ or $V_{dssw}<V_{th}$. In this connection structure, the preset voltage threshold is usually 0. The process may be understood with reference to FIG. 7. As shown in FIG. 7, the process may include the following operations.

201: The control circuit detects the target voltage.

The control circuit detects the target voltage $V_{dssw}$ at target dead time during which the excitation current is in the continuous state.

202: The control circuit determines whether $V_{dssw}>V_{th}$ is true.

In the control circuit, a magnitude relationship between voltages may be compared in this application by using a comparator.

203: If $V_{dssw}>V_{th}$ is true, the control circuit controls next turn-on duration of the auxiliary power transistor $Q_2$ to be last turn-on duration $T\_Q_2$ of the auxiliary power transistor $Q_2$ plus t0.

That is, if $V_{dssw}>V_{th}$, $T\_Q_2=T\_Q_2+t0$.

If $V_{dssw}>V_{th}$, it indicates that the target voltage needs to be further reduced, and turn-on duration of the auxiliary power transistor needs to be increased, so that the excitation current in the negative direction of the transformer further increases. In this way, the target voltage correspondingly decreases.

Figure 8:
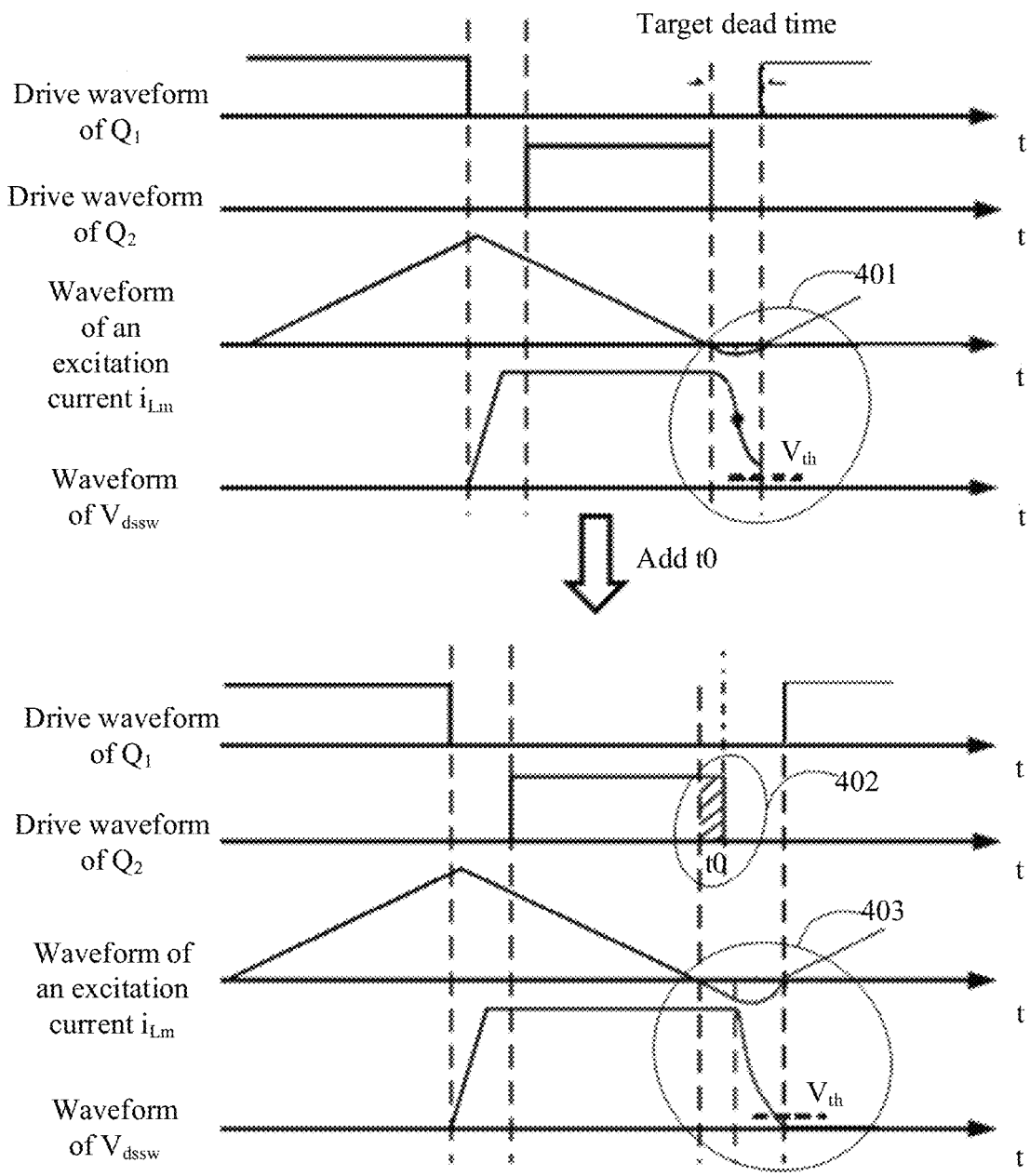
FIG. 8 is another time sequence diagram when a converter operates according to an embodiment of this application.

For a variation of the excitation current and the target voltage when t0 is added, refer to FIG. 8 for understanding.

FIG. 8 is a time sequence diagram of several parameters of the converter when t0 is added. After t0 is added to 402 marked in FIG. 8, it can be learned from a comparison between marked 401 and 403 that when t0 is added, the excitation current $i_{Lm}$ is increased in the negative direction, the target voltage Vass, is also reduced more and is closer to or equal to the preset voltage threshold $V_{th}$.

204: If $V_{dssw}>V_{th}$ is not true, the control circuit controls next turn-on duration of the auxiliary power transistor $Q_2$ to be last turn-on duration $T\_Q_2$ of the auxiliary power transistor $Q_2$ minus t0.

That is, if $V_{dssw}<V_{th}$, $T\_Q_2=T\_Q_2-t0$.

If $V_{dssw}<V_{th}$, it indicates that the target voltage needs to be increased, that is, the excitation current in the negative direction of the transformer needs to be reduced. This objective may be achieved by shortening turn-on duration of the auxiliary power transistor.

Figure 9:
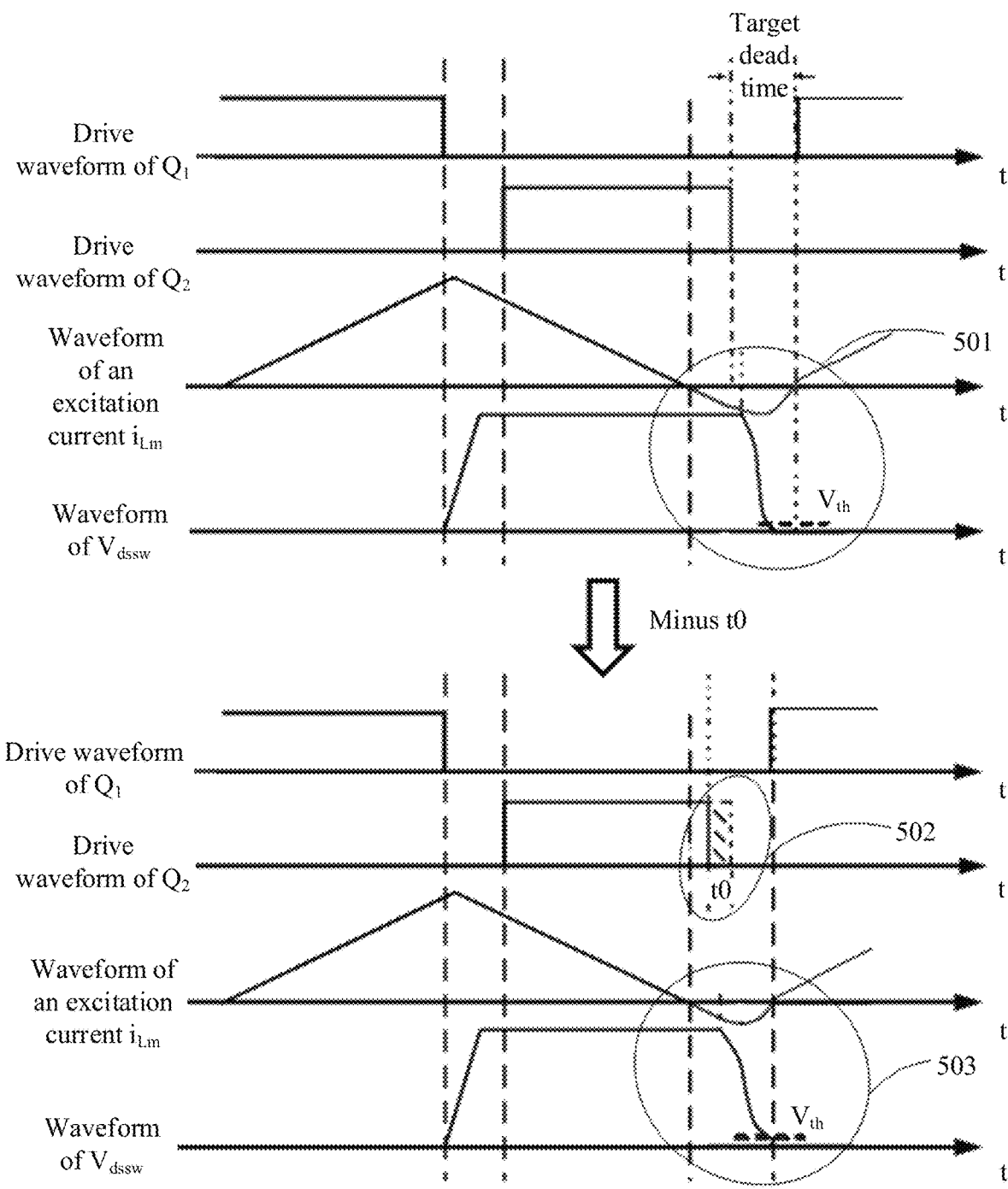
FIG. 9 is another time sequence diagram when a converter operates according to an embodiment of this application.

For a variation of the excitation current and the target voltage caused by reducing t0, refer to FIG. 9 for understanding.

FIG. 9 is a time sequence diagram of several parameters of the converter when t0 is reduced. After t0 is reduced from 502 marked in FIG. 9, it can be learned from a comparison between 501 and 503 that when t0 is reduced, a magnitude of an increase in the excitation current $i_{Lm}$ in the negative direction decreases, and a magnitude of a decrease in the target voltage Vass, also decreases, so that the target voltage is closer to or equal to the preset voltage threshold $V_{th}$.

In FIG. 8 and FIG. 9, the target dead time in this application refers to the first dead time.

In this way, regardless of the comparison result, the target voltage may be as close to the preset voltage threshold as possible through corresponding regulation, so that the target voltage reaches a valley point voltage as soon as possible. In this way, the primary power transistor can be turned on at a lower voltage, and the energy loss of the primary power transistor can be further reduced.

2. The first terminals of the primary power transistor and the auxiliary power transistor are source electrodes, and the second terminals thereof are drain electrodes. The source electrode of the primary power transistor is connected to the drain electrode of the auxiliary power transistor, the source electrode of the auxiliary power transistor is connected to the negative electrode of the DC power supply, and the drain electrode of the primary power transistor is connected to the positive electrode of the DC power supply.

Figure 10:
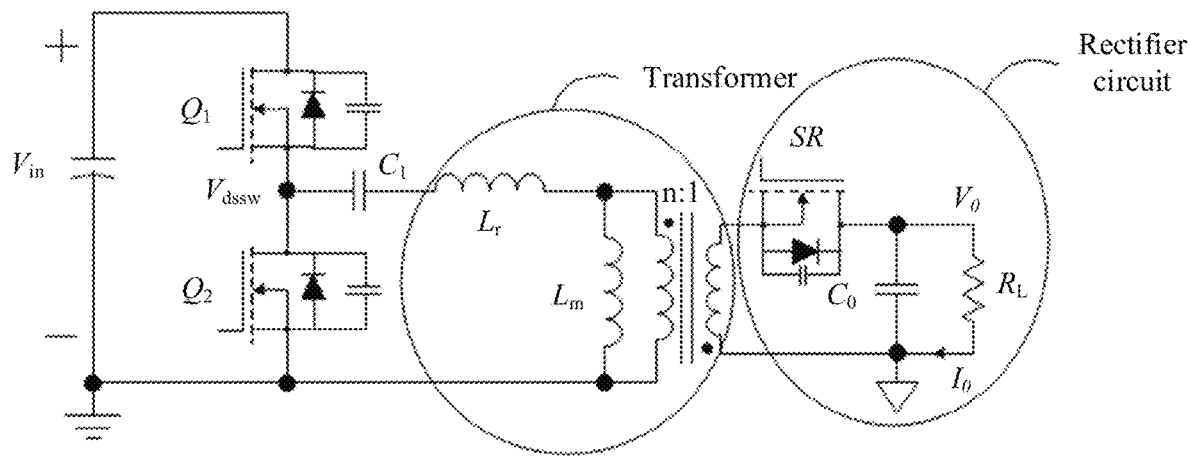
FIG. 10 is another circuit diagram of a converter according to an embodiment of this application.

For a circuit diagram of this connection relationship, refer to FIG. 10 for understanding. As shown in FIG. 10, $Q_1$ is the primary power transistor, $Q_2$ is the auxiliary power transistor, $C_1$ is the first capacitor, and $V_{in}$ is a voltage output by the DC power supply. "+" is the positive electrode, "−" is the negative electrode, and $V_{dssw}$ is the target voltage. Although not shown in FIG. 10, actually, the control circuit may be connected to the source electrode and a gate electrode of the primary power transistor, so as to control turn-on or turn-off of the primary power transistor. FIG. 10 further shows the transformer and a rectifier circuit. The rectifier circuit is connected to a secondary side of the transformer, and the rectifier circuit is configured to rectify a current output by the transformer.

In FIG. 10, a series circuit formed by the transformer and the first capacitor $C_1$ is connected in parallel to the source electrode and the drain electrode of the auxiliary power transistor $Q_2$. The source electrode of the auxiliary power transistor $Q_2$ is connected to the positive electrode, the drain electrode of the primary power transistor $Q_1$ is connected to the negative electrode, and the source electrode of the primary power transistor $Q_1$ is connected to the drain electrode of the auxiliary power transistor $Q_2$. The transformer includes a primary-side winding and a secondary-side winding, a dotted terminal of the primary-side winding is connected to the first capacitor $C_1$, and a dotted terminal of the secondary-side winding is grounded.

In the connection relationship formula shown in FIG. 10, the control circuit determines the comparison result between the target voltage and the preset voltage threshold. When the comparison result indicates that the target voltage is greater than the preset voltage threshold, next turn-on duration of the auxiliary power transistor is shortened on a basis of last turn-on duration of the auxiliary power transistor, or when the comparison result indicates that the target voltage is less than the preset voltage threshold, next turn-on duration of the auxiliary power transistor is prolonged on a basis of last turn-on duration of the auxiliary power transistor.

Figure 11:
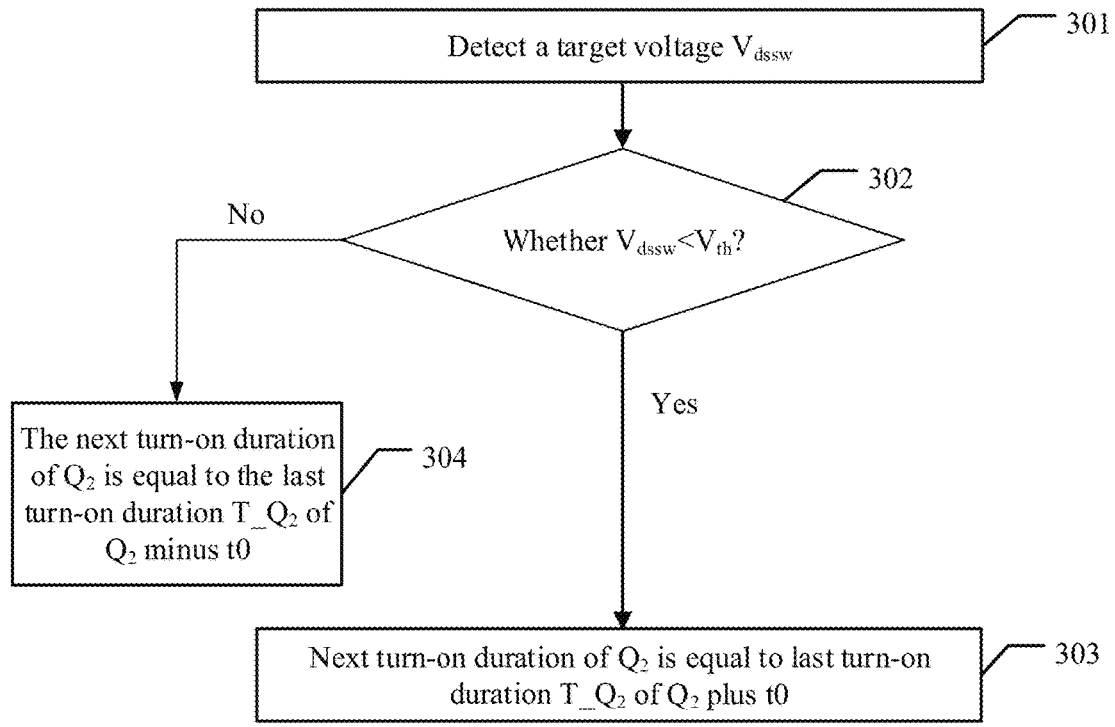
FIG. 11 is a schematic diagram of another regulation process of turn-on duration of an auxiliary power transistor according to an embodiment of this application.

If the preset voltage threshold is represented by $V_{in}$, the comparison result may be $V_{dssw}>V_{th}$ or $V_{dssw}<V_{th}$. In this connection structure, the preset voltage threshold is usually a voltage difference yin between both terminals of the DC power supply. The process may be understood with reference to FIG. 11. As shown in FIG. 11, the process may include the following operations.

301: The control circuit detects the target voltage.

302: Determine whether $V_{dssw}<V_{th}$ is true.

In the control circuit, a magnitude relationship between voltages may be compared in this application by using a comparator.

303: If $V_{dssw}<V_{th}$ is true, the control circuit controls next turn-on duration of the auxiliary power transistor $Q_2$ to be last turn-on duration $T\_Q_2$ of the auxiliary power transistor $Q_2$ plus t0.

That is, if $V_{dssw}<V_{th}$, $T\_Q_2=T\_Q_2+t0$.

If $V_{dssw}<V_{th}$, it indicates that the target voltage needs to be increased, and the excitation current in the negative direction needs to be increased. In this way, the target voltage correspondingly increases, and the excitation current can be increased by increasing turn-on duration of the auxiliary power transistor. Therefore, when $V_{dssw}<V_{th}$, the turn-on duration of the auxiliary power transistor needs to be increased.

304: If $V_{dssw}<V_{th}$ is not true, the control circuit controls next turn-on duration of the auxiliary power transistor $Q_2$ to be last turn-on duration $T\_Q_2$ of the auxiliary power transistor $Q_2$ minus t0.

That is, if $V_{dssw}>V_{th}$, $T\_Q_2=T\_Q_2-t0$.

If $V_{dssw}>V_{th}$, it indicates that the target voltage needs to be reduced, and the excitation current in the negative direction needs to be reduced. In this way, the target voltage correspondingly decreases, and a magnitude of the excitation current can be reduced by shortening the turn-on duration of the auxiliary power transistor. Therefore, when $V_{dssw}>V_{th}$, the turn-on duration of the auxiliary power transistor needs to be shortened.

In this way, regardless of the comparison result, the target voltage may be as close to the preset voltage threshold as possible through corresponding regulation, so that the target voltage reaches a valley point voltage as soon as possible. In this way, the primary power transistor can be turned on at a lower voltage, and the energy loss of the primary power transistor can be further reduced.

The control circuit may repeatedly perform the processes of FIG. 7 and FIG. 11 by using an adaptive policy, that is, the control circuit repeatedly regulates the turn-on duration of the auxiliary power transistor by using the adaptive policy, so that $V_{dssw}$ is constantly close to $V_{th}$, and is finally regulated to be $V_{dssw}=V_{th}$.

Figure 12:
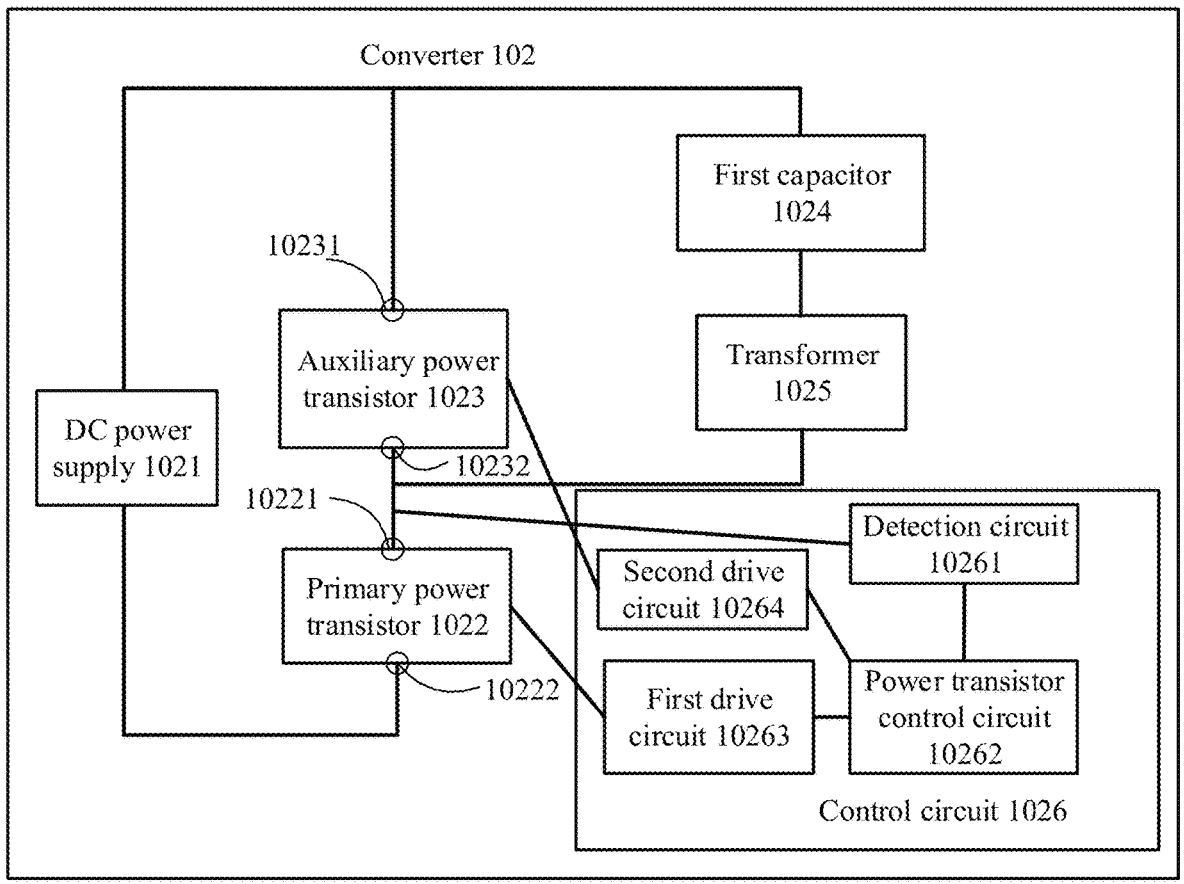
FIG. 12 is a schematic diagram of another structure of a converter according to an embodiment of this application.

In this application, as shown in FIG. 12, the control circuit includes a detection circuit 10261, a power transistor control circuit 10262, a first drive circuit 10263, and a second drive circuit 10264. The power transistor control circuit 10262 is separately connected to the detection circuit 10261, the first drive circuit 10263, and the second drive circuit 10264, the first drive circuit 10263 is connected to the primary power transistor 1022, and the second drive circuit 10264 is connected to the auxiliary power transistor 1023. The detection circuit 10261 is configured to detect a target voltage. The power transistor control circuit 10262 is configured to send a drive signal for the first drive circuit or the second drive circuit based on a detection result of the detection circuit. The first drive circuit 10263 is configured to drive, based on the drive signal, the primary power transistor 1022 to be turned on or turned off. The second drive circuit 10264 is configured to drive, based on the drive signal, the auxiliary power transistor 1023 to be turned on or turned off.

The circuit diagrams shown in FIG. 6 and FIG. 10 may further include a second capacitor. Two terminals of the second capacitor are respectively connected to the positive electrode and the negative electrode of the DC power supply.

The circuits shown in FIG. 6 and FIG. 10 may be used in an asymmetric half-bridge flyback topology.

Figure 13:
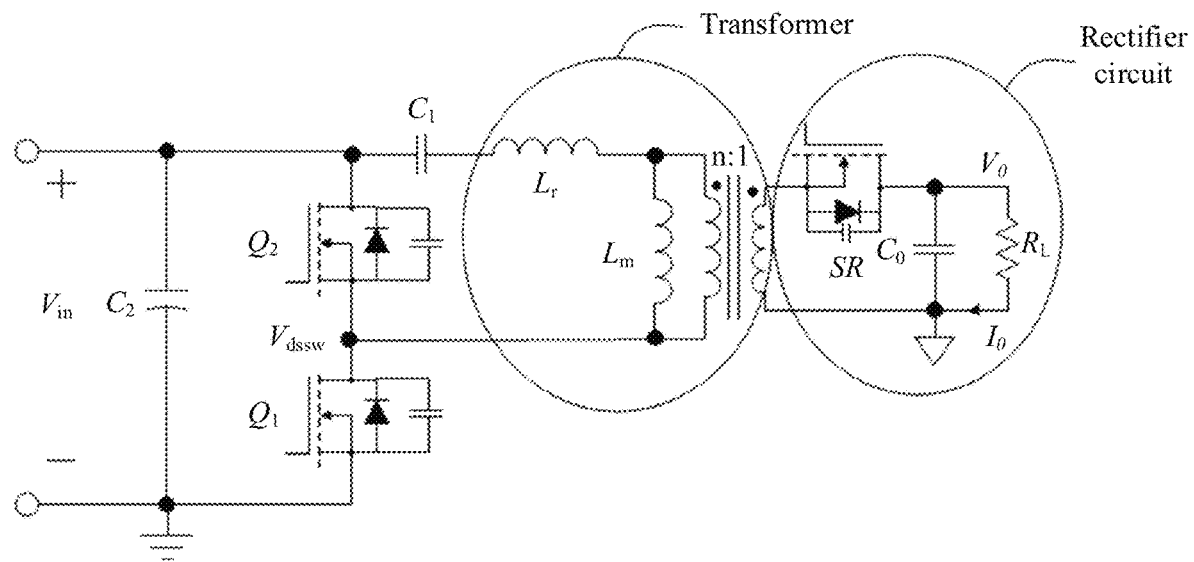
FIG. 13 is another circuit diagram of a converter according to an embodiment of this application.
Figure 14:
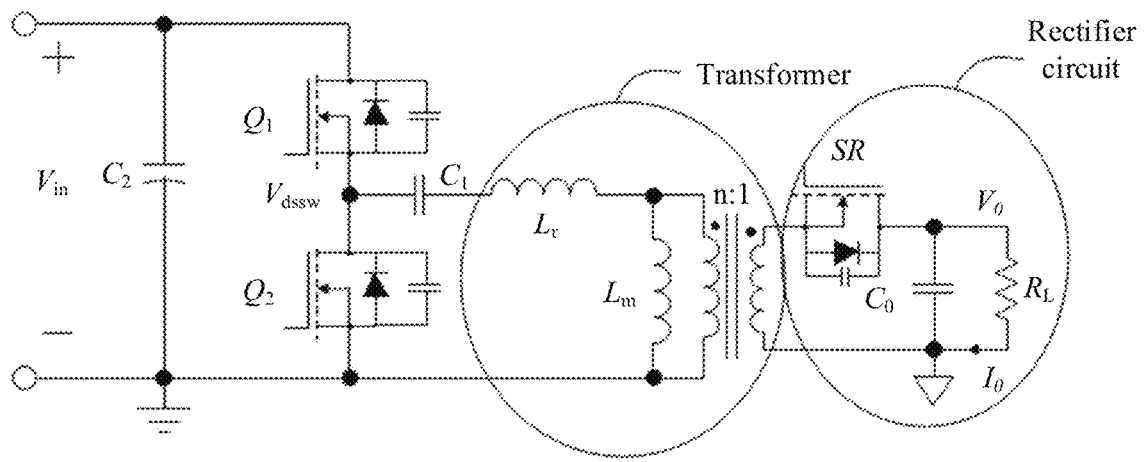
FIG. 14 is another circuit diagram of a converter according to an embodiment of this application.

The converter in the foregoing solutions provided in this application is not limited to use in the asymmetric half-bridge flyback topology shown in FIG. 6 or FIG. 10, but may also be used in an asymmetric half-bridge forward topology shown in FIG. 13 and FIG. 14.

In FIG. 13, in addition to the clearly marked second capacitor $C_2$, a difference from FIG. 6 lies in that the transformer includes a primary-side winding and a secondary-side winding, a dotted terminal of the primary-side winding is connected to the first capacitor $C_1$, and a dotted terminal of the secondary-side winding is connected to a synchronous rectifier SR in the rectifier circuit. Other parts may be understood with reference to the content in FIG. 6.

In FIG. 14, in addition to the clearly marked second capacitor $C_2$, a difference from FIG. 10 lies in that the transformer includes a primary-side winding and a secondary-side winding, a dotted terminal of the primary-side winding is connected to the first capacitor $C_1$, and a dotted terminal of the secondary-side winding is connected to a synchronous rectifier of the secondary side.

In some embodiments, the converter provided in the foregoing embodiments may be further used in another product in addition to the power adapter, for example, an in-vehicle power supply, a base station power supply, or another product related to a DC/DC converter.

The foregoing is merely specific implementations of the embodiments of this application, but the protection scope of the embodiments of this application is not limited thereto.

What is claimed is:

1. A converter, comprising:
a DC power supply;
a primary power transistor;
an auxiliary power transistor;
a first capacitor;
a transformer; and
a control circuit, wherein
the first capacitor is connected in series to the transformer to form a series circuit, the series circuit is directly connected in parallel to a first terminal and a second terminal of the auxiliary power transistor, a first terminal of the primary power transistor is connected to the second terminal of the auxiliary power transistor, a second terminal of the primary power transistor is connected to either a positive electrode or a negative electrode of the DC power supply, the first terminal of the auxiliary power transistor is connected to the other electrode of the DC power supply, and the negative electrode is grounded;
the transformer comprises a primary-side winding and a secondary-side winding, a dotted terminal of the primary-side winding is connected to the first capacitor, and a dotted terminal of the secondary-side winding is connected to a synchronous rectifier;
the control circuit comprises: a detection circuit, a power transistor control circuit, a first drive circuit, and a second drive circuit, the power transistor control circuit is separately connected to the detection circuit, the first drive circuit, and the second drive circuit, the first drive circuit is connected to the primary power transistor, and the second drive circuit is connected to the auxiliary power transistor; the detection circuit is configured to detect a target voltage; the power transistor control circuit is configured to send a drive signal for the first drive circuit or the second drive circuit based on a detection result of the detection circuit; the first drive circuit is configured to drive, based on the drive signal, the primary power transistor to be turned on or turned off; and the second drive circuit is configured to drive, based on the drive signal, the auxiliary power transistor to be turned on or turned off; and
the control circuit is configured to: when an excitation current in the transformer is in a continuous state, regulate the target voltage to a preset voltage threshold, and control the primary power transistor to be turned on when a first dead time ends; and in a switching cycle, if the excitation current in the transformer is continuous, detect the target voltage during a second dead time, wherein the second dead time is a period of time after the auxiliary power transistor is turned off and before the primary power transistor is turned on, and regulate turn-on duration of the auxiliary power transistor that adjusts the first dead time based on the target voltage, wherein the first dead time is a period of time after the auxiliary power transistor is turned off and before the primary power transistor is turned on, and the target voltage is a voltage between the first terminal of the primary power transistor and ground, in the switching cycle, the primary power transistor and the auxiliary power transistor each are turned on at least once, and the second dead time is before the first dead time.

2. The converter of claim 1, wherein
the control circuit is configured to: determine a comparison result between the target voltage and the preset voltage threshold, and regulate the turn-on duration of the auxiliary power transistor corresponding to the first dead time based on the comparison result.

3. The converter of claim 2, wherein the second terminal of the primary power transistor is connected to the negative electrode, and the first terminal of the auxiliary power transistor is connected to the positive electrode; and
the control circuit is configured to: when the comparison result indicates that the target voltage is greater than the preset voltage threshold, prolong next turn-on duration of the auxiliary power transistor corresponding to the first dead time on a basis of a last turn-on duration of the auxiliary power transistor, or when the comparison result indicates that the target voltage is less than the preset voltage threshold, shorten next turn-on duration of the auxiliary power transistor corresponding to the first dead time on a basis of the last turn-on duration of the auxiliary power transistor.

4. The converter of claim 2, wherein the second terminal of the primary power transistor is connected to the positive electrode, and the first terminal of the auxiliary power transistor is connected to the negative electrode; and
the control circuit is configured to: when the comparison result indicates that the target voltage is greater than the preset voltage threshold, shorten next turn-on duration of the auxiliary power transistor corresponding to the first dead time on a basis of a last turn-on duration of the auxiliary power transistor, or when the comparison result indicates that the target voltage is less than the preset voltage threshold, prolong next turn-on duration of the auxiliary power transistor corresponding to the first dead time on a basis of the last turn-on duration of the auxiliary power transistor.

5. The converter of claim 1, wherein the converter comprises a second capacitor, and two terminals of the second capacitor are respectively connected to the positive electrode and the negative electrode.

6. The converter of claim 1, wherein the dotted terminal of the secondary-side winding is grounded.

7. The converter of claim 1, wherein regulating the turn-on duration of the auxiliary power transistor changes a magnitude of the excitation current in a negative direction in the transformer.

8. A power adapter, comprising:
a converter;
an AC/DC converter, and
a filter circuit, wherein
the filter circuit is separately connected to the AC/DC converter and the converter;
the AC/DC converter is configured to convert an alternating current in a power grid into a direct current;
the converter is configured to provide a DC voltage for a load, the converter comprises a DC power supply, a primary power transistor, an auxiliary power transistor, a first capacitor, a transformer, and a control circuit;
the first capacitor is connected in series to the transformer to form a series circuit, the series circuit is directly connected in parallel to a first terminal and a second terminal of the auxiliary power transistor, a first terminal of the primary power transistor is connected to the second terminal of the auxiliary power transistor, a second terminal of the primary power transistor is connected to either a positive electrode or a negative electrode of the DC power supply, the first terminal of the auxiliary power transistor is connected to the other electrode of the DC power supply, and the negative electrode is grounded;

the transformer comprises a primary-side winding and a secondary-side winding, a dotted terminal of the primary-side winding is connected to the first capacitor, and a dotted terminal of the secondary-side winding is connected to a synchronous rectifier;

the control circuit comprises: a detection circuit, a power transistor control circuit, a first drive circuit, and a second drive circuit, the power transistor control circuit is separately connected to the detection circuit, the first drive circuit, and the second drive circuit, the first drive circuit is connected to the primary power transistor, and the second drive circuit is connected to the auxiliary power transistor; the detection circuit is configured to detect a target voltage; the power transistor control circuit is configured to send a drive signal for the first drive circuit or the second drive circuit based on a detection result of the detection circuit; the first drive circuit is configured to drive, based on the drive signal, the primary power transistor to be turned on or turned off; and the second drive circuit is configured to drive, based on the drive signal, the auxiliary power transistor to be turned on or turned off;

the control circuit is configured to: when an excitation current in the transformer is in a continuous state, regulate the target voltage to a preset voltage threshold, and control the primary power transistor to be turned on when a first dead time ends; and in a switching cycle, if the excitation current in the transformer is continuous, detect the target voltage during a second dead time, wherein the second dead time is a period of time after the auxiliary power transistor is turned off and before the primary power transistor is turned on, and regulate turn-on duration of the auxiliary power transistor that adjusts the first dead time based on the target voltage, wherein the first dead time is a period of time after the auxiliary power transistor is turned off and before the primary power transistor is turned on, and the target voltage is a voltage between the first terminal of the primary power transistor and ground, in the switching cycle, the primary power transistor and the auxiliary power transistor each are turned on at least once, and the second dead time is before the first dead time;

the filter circuit is configured to filter noise in the AC/DC converter and the converter.

9. The power adapter of claim 8, wherein
the control circuit is configured to: determine a comparison result between the target voltage and the preset voltage threshold, and regulate the turn-on duration of the auxiliary power transistor corresponding to the first dead time based on the comparison result.

10. The power adapter of claim 9, wherein the second terminal of the primary power transistor is connected to the negative electrode, and the first terminal of the auxiliary power transistor is connected to the positive electrode; and
the control circuit is configured to: when the comparison result indicates that the target voltage is greater than the preset voltage threshold, prolong next turn-on duration of the auxiliary power transistor corresponding to the first dead time on a basis of a last turn-on duration of the auxiliary power transistor, or when the comparison result indicates that the target voltage is less than the preset voltage threshold, shorten next turn-on duration of the auxiliary power transistor corresponding to the first dead time on a basis of the last turn-on duration of the auxiliary power transistor.

11. The power adapter of claim 9, wherein the second terminal of the primary power transistor is connected to the positive electrode, and the first terminal of the auxiliary power transistor is connected to the negative electrode; and
the control circuit is configured to: when the comparison result indicates that the target voltage is greater than the preset voltage threshold, shorten next turn-on duration of the auxiliary power transistor corresponding to the first dead time on a basis of a last turn-on duration of the auxiliary power transistor, or when the comparison result indicates that the target voltage is less than the preset voltage threshold, prolong next turn-on duration of the auxiliary power transistor corresponding to the first dead time on a basis of the last turn-on duration of the auxiliary power transistor.

12. The power adapter of claim 8, wherein the converter comprises a second capacitor, and two terminals of the second capacitor are respectively connected to the positive electrode and the negative electrode.

13. The power adapter of claim 8, wherein the dotted terminal of the secondary-side winding is grounded.

14. The power adapter of claim 8, wherein regulating the turn-on duration of the auxiliary power transistor changes a magnitude of the excitation current in a negative direction in the transformer.

\* \* \* \* \*